United States Patent Office 3,404,947
Patented Oct. 8, 1968

3,404,947
PROCESS FOR WASTE DISPOSAL
Arthur F. Miller, Lyndhurst, and Richard C. Keiffer, Cleveland, Ohio, assignors to The Standard Oil Company, Cleveland, Ohio, a corporation of Ohio
No Drawing. Filed Feb. 14, 1966, Ser. No. 527,086
6 Claims. (Cl. 23—1)

ABSTRACT OF THE DISCLOSURE

The instant application relates to a method for incinerating a waste aqueous stream containing ammonium sulfate and high-molecular weight organic polymeric materials, incidental to the manufacture of acrylonitrile and methacrylonitrile, known generally as "heavies."

---

This invention relates to an improved method for the incineration of waste materials from a plant for the manufacture of an $\alpha$-$\beta$ monoolefinically unsaturated nitrile, which waste material comprises a mixture of inorganic and organic water-soluble materials. More particularly, this invention relates to an improved method for incinerating a mixture of ammonium mineral acid salt and organic heavies in a waste water stream from an acrylonitrile or methacrylonitrile plant.

Incineration is the only practical way to dispose of many industrial waste materials effectively. This is particularly true of toxic waste materials which are hazardous to store, and disposing of which by dilution with water, then discharging into streams, is not very desirable. Some waste materials in this category are by-products in industrial processes for the production of acrylonitrile or methacrylonitrile. Though incineration appears to be quite simple and readily accomplished, there are certain problems in the operation of this process of incineration which are difficult to overcome. One such problem is the maintenance of the stream to be incinerated in a fluid form so it may be atomized from the burner nozzles without plugging them up. It is readily seen that the accumulation of heavy organic materials which are not only polymerizable but many of which are effective agglomerating agents, would tend to deposit quantities of heavy polymeric material in the lines resulting in plugged burner nozzles. One method of coping with the problem is to shut down the incinerator and the pumping equipment for the waste stream and to cut in high pressure water to clear the nozzles. Often this method does not work as it tends to compact further the polymeric material in the nozzles and in other places where the build-up has been quite heavy. Aside from the inconvenience of this procedure and its hit-or-miss effectiveness, having to discontinue the operation of the burners necessitates storing this material somewhere while the burners are being cleaned out. By far the better solution would be to maintain this waste material stream being fed to the burners in a continuously fluid form so that there would be no pluggage of the burners or the burner nozzles and the incinerator could be operated continuously. This invention overcomes the problem of pluggage.

An object of this invention is to provide a process for maintaining the waste disposal stream from an acrylonitrile or methacrylonitrile plant in a fluid, easily pumpable, non-plugging stream capable of being easily atomized in the burners of the incinerator and burned.

The following general description of the instant invention is specifically with respect to an acrylonitrile plant but is equally applicable, with obvious modifications, to a methacrylonitrile plant.

In U.S. Patent No. 2,904,580, filed Sept. 20, 1957, a process is described for the manufacture of acrylonitrile which comprises the gaseous phase catalytic reaction of propylene, ammonia and molecular oxygen-containing gas. In this vapor phase catalytic reaction preferably carried out in a fluidized bed type reactor, a part of the ammonia which is introduced as feed to the reaction is unreacted and consequently the effluent gases from the reactor contain, in addition to acrylonitrile, a small but nevertheless appreciable amount of ammonia as well as some unreacted feed materials such as propylene, oxygen and nitrogen. The reactor effluent will also usually contain other reaction products such as hydrogen cyanide, acetonitrile, etc.

Acrylonitrile, which is the principal product of the aforesaid process, may be recovered from the reactor effluent gases by scrubbing the hot gases with a suitable solvent such as water or a glycol such as ethylene glycol, or a mixture of such solvents, in an absorber or quench tower. This is usually done after briefly heat-exchanging the effluent reactor gases with incoming feed gases and then leading the reactor effluent gases at a temperature in the range of 300 to 500° F. into the bottom of a quench tower in which it is counter-currently scrubbed with dilute mineral acid. Any mineral acid may be used, but it is preferred to use an acid, the ammonium salt of which has good fertilizer value or a ready market. Such preferred acids are phosphoric, nitric, sulfuric and hydrochloric acids. The dilute mineral acid reacts with ammonia and makes it unavailable for the formation of by-products resulting from the direct reaction of ammonia and acrylonitrile such as $\beta$-aminopropionitrile, $\beta,\beta'$ amino dipropionitrile and $\beta$-$\beta'$-$\beta''$ nitrilo tripropionitrile.

Despite the speed of the neutralization reaction, some cyanoethylation of the ammonia does take place, as not all the excess ammonia in the reactor effluent gases can be removed quickly enough by reaction with the dilute acid. As a result, these cyanoethylated products react with other constituents of the reactor effluent stream and form various polymers. Some of them are quite heavy and most of them are characteristically soluble in water, with the result that the stream issuing from the bottom of the quench tower is a dilute water solution of the ammonium salt of the mineral acid used, containing some acrylonitrile and other desirable products of reaction, and contaminated with organic "heavies" in solution. Some of these "heavies" are carbonyl polymers, cyanhydrins, hydrolyzed polyacrylonitrile, polyacrylamide and cyanoethylated side reaction products.

In a subsequent step, the overhead from the quench tower is led into a refrigerated absorber and the bottoms from the quench tower is split into two streams, one of which is cooled and recycled to the top of the quench tower, the other is fractionated in a waste-water column. The overhead from the waste-water column, usually an amount in the range of about 5–25% by weight of the feed to the column, contains some acrylonitrile and other desirable organic compounds such as acetonitrile, hydrogen cyanide, propionitrile, etc., which are led into the refrigerated absorber. The bottoms from the waste-water column is a waste-water stream, the incineration of which is the subject of the instant invention. This waste-water column bottoms stream usually contains from about 60–92% by weight water, 4–20% by weight ammonium sulfate, and 4–20% by weight organics, the precise composition depending upon the operation of the manufacturing facility.

Though it is possible to combust organic components of the waste-water column bottoms stream at the burner nozzles of the incinerator, it is preferred to concentrate the "heavies" to be burned, in a preliminary step, chiefly to save on fuel costs. It must be borne in mind that fuel for heat energy must be provided not only to evaporate each pound of water introduced into the incinerator, but also to raise the temperature level of the vapors in the incinerator to a sufficiently high temperature to destroy both the ammonium salt and the "heavies." As it is impractical to do this because of the large excess of water in the stream, a more economical and acceptable method of incinerating this waste stream is to concentrate the "heavies" in a preliminary step so that the amount of water in the water stream is reduced.

Accordingly, a preferred embodiment of this invention includes removal of water from this waste-water stream by any of several well-known means. For example this dilute solution may be heated either by heat exchange with a hot surface, or by direct submerged combustion of gases under the surfaces of the liquid, or by dialysis through a semi-permeable membrane, or by ion exchange using an acidic ion-exchange resin such as carboxylic ion-exhange resins. Another method of removing water from the solution, which might have particular utility under specially favorable conditions, is by freezing and fractional crystallization, forming ice crystals which may be continuously skimmed off.

A preferred method of removing diluent water efficiently is by sub-surface direct-combination evaporation in a conical bottom evaporator wherein the evaporation is preferably effected by submerged combustion in a central "evaporation-zone." As diluent water is removed as vapor, the dissolved-solids content of the liquid in the "evaporation zone" increases, the density of the liquid in the zone increases and the resulting concentrated solution gravitates to the apex of the conical evaporator from which it is withdrawn and pumped to the incinerator. However, during this step and as a direct result of water removal, the dissolved solids are precipitated from solution causing pluggage, both in the evaporator and in the line from the evaporator to the incinerator.

The overhead from the evaporator, usually an amount in the range of about 30–65% by weight of the feed to the evaporator, is predominantly steam. The overhead is heat-exchanged and disposed of. The bottoms from the incinerator contains from about 4–20% organic "heavies," 9–20% ammonium sulfate and 60–87% water.

It has been found that certain water-soluble nitrogen-based compounds or water solutions of these compounds when dissolved in the waste-water stream, are unexpectedly effective in maintaining the organic "heavies" in solution despite the removal of water, which results in a solution of high dissolved-solids content. Preferred nitrogen-based compounds are ammonia, methylamine, ethylamine, n-propylamine, n-butylamine, n-amylamine, dimethylamine, di-n-propylamine, trimethylamine, ethylenediamine, trimethylenediamine, ethanolamine, diethanolamine, and triethanolamine. More preferred are ammonia, ethylamine and ethanolamine.

As a result of the peculiar property of the aforementioned nitrogen-based compounds, it is now feasible to remove water from the waste-water column bottoms stream, thus concentrating the dissolved solids in the resulting solution without dropping out the organic heavies. The concentrated solution from the evaporator containing from about 10–60% by weight organic "heavies" is pumped to the incinerator and ignited at the burner nozzles.

Air, rather than ammonia, may be injected into the evaporator and into the lines from the evaporator to the incinerator but this method of keeping the solids in suspension relies chiefly on mechanical agitation of the fluid, thus preventing settling, and is not particularly useful. Though some emulsifiers do help keep the precipitated solids in solution if sufficient agitation is provided, it is found that relatively large amounts of emulsifier are required because of the presence of the dissolved ammonium mineral salt. Thus, the use of emulsifiers is not economical and provides no particular advantage.

Table I specifies the composition of a typical waste-water column bottoms stream obtained from an acrylonitrile manufacturing plant. The composition of the stream would vary depending upon the operation of the plant.

TABLE I.—CHARACTERIZATION OF WASTE WATER COLUMN BOTTOMS FEED

Obtained from Lima acrylonitrile plant on June 26, 1964.

9.57 wt. percent solids (slow evapn. to dryness, 6 hrs. at 120° C.).
0.48 wt. percent cyanide.
1.65 wt. percent $NH_3$ by titration.
pH of 4.9–5.0.
1.47% sulfur.
Chemical oxygen demand, 45,404, 46,754, 44,022 p.p.m.
Total nitrogen of 2.17%.

| Nitrogen types: | Percent |
|---|---|
| Nitrate | 0.0061 |
| Nitrite | 0.054 |
| Amide | 0.31 |
| $NH_3$ | 1.37 |
| Nitrile (by difference) | 0.42 |
| G.C.–M.S. analysis: | |
| Acetaldehyde | 0.1 |
| Acrolein | 0.02 |
| HCN | 0.4 |
| Acetic acid | 0.2 |
| Fumaronitrile | 0.05 |
| Acrylic acid | 0.03 |
| Acrylamide | 0.1 |

Color similar to strong tea or coffee. Usually contains some catalyst fines.

The following example illustrates the process of this invention:

Example I 100 parts by weight of waste-water column bottoms characterized by Table I were evaporated slowly in a flask at atmospheric pressure. When about 50 parts by weight were left in the flask anhydrous ammonia was bubbled into the liquid, near the bottom. The pH of the liquid increased from about 4.9 at the start of evaporation to about pH 10 when the ammonia to the liquid was cut off. Evaporation was continued till only 20 parts by weight of the original liquid remained in the flask, at which point, an organic scum was observed to form in the liquid.

The following example illustrates the result of concentration of a typical waste-water column bottoms sample by evaporation, without the addition of anhydrous ammonia:

Example II 100 parts by weight of waste-water column bottoms characterized by Table I were evaporated slowly in a flask at atmospheric pressure. When about 50 parts by weight were left in the flask, the liquid was clear and amber-colored with no organic material precipitated from solution. When about 37 parts by weight were left in the flask it was noted that an organic scum formed in the liquid. Further concentration precipitated more organic material.

We claim:
1. A process for the incineration of waste materials formed as by-products in a commercial plant for the manufacture of a member selected from the group consisting of acrylonitrile and methacrylonitrile comprising withdrawing a bottoms draw-off stream from a waste-water column, said stream comprising from about 60 to 87% by weight water and 9 to 20% by weight of a mineral acid ammonium salt and 4 to 20% by weight organics, adding to at least a portion of said stream an effective amount of at least one member selected from the group consisting of ammonia, ethylamine, and ethanolamine, sufficient to maintain substantially all organic material in solution, concentrating said solution in an evaporator, transporting said concentrated solution from said evaporator to an incinerator and burning said concentrated solution in said incinerator.

2. The process of claim 1 wherein the commercial plant is for the manufacture of acrylonitrile and the compound added is ethylamine.

3. The process of claim 1 wherein the commercial plant is for the manufacture of methacrylonitrile and the compound added is ethylamine.

4. The process of claim 1 wherein the commercial plant is for the manufacture of acrylonitrile and the compound added is ammonia.

5. The process of claim 1 wherein the commercial plant is for the manufacture of methacrylonitrile and the compound added is ammonia.

6. The process of claim 1 wherein the concentrated solution from the evaporator comprises from about 10 to 60% by weight organics.

References Cited

UNITED STATES PATENTS

| | | | |
|---|---|---|---|
| 2,748,156 | 5/1956 | Keller et al. | 252—441 XR |
| 2,778,847 | 1/1957 | Fujisaki et al. | 260—465.3 |
| 2,920,098 | 1/1960 | Burrus et al. | 260—465.3 |
| 3,037,931 | 6/1962 | Gayhardt | 210—58 |
| 3,145,076 | 8/1964 | Reichert et al. | 23—1 |
| 3,174,820 | 3/1965 | See et al. | 23—1 |
| 3,349,921 | 10/1967 | Niwa et al. | 23—1 XR |

OSCAR R. VERTIZ, *Primary Examiner.*

E. STERN, *Assistant Examiner.*